United States Patent [19]
Thompson et al.

[11] Patent Number: 5,961,602
[45] Date of Patent: Oct. 5, 1999

[54] METHOD FOR OPTIMIZING OFF-PEAK CACHING OF WEB DATA

[75] Inventors: Joseph Raymond Thompson, Round Rock; Viktors Berstis, Austin, both of Tex.

[73] Assignee: International Business Machines Corporation, Armonk, N.Y.

[21] Appl. No.: 08/797,902

[22] Filed: Feb. 10, 1997

[51] Int. Cl.$^6$ ...................................................... G06F 15/16
[52] U.S. Cl. ........................... 709/229; 709/218; 711/124
[58] Field of Search ................................. 711/124; 348/6, 348/10; 395/712, 287, 704, 200.59, 200.48, 200.68, 200.56; 340/825.06; 370/234; 709/229, 226, 238, 218

[56] References Cited

U.S. PATENT DOCUMENTS

| | | | |
|---|---|---|---|
| 5,369,766 | 11/1994 | Nakano et al. | 395/700 |
| 5,416,739 | 5/1995 | Wong | 365/189.01 |
| 5,440,719 | 8/1995 | Hanes et al. | 395/500 |
| 5,446,844 | 8/1995 | Steckler et al. | 395/250 |
| 5,581,704 | 12/1996 | Barbara et al. | 395/200.09 |
| 5,608,446 | 3/1997 | Carr et al. | 348/6 |
| 5,761,683 | 6/1998 | Logan et al. | 707/513 |
| 5,787,470 | 7/1998 | DeSimone et al. | 711/124 |

OTHER PUBLICATIONS

Load Balancing for Multiple Interfaces for Transmission Control Protocol/Internet Protocol for VM/MVS, IBM Technical Disclosure Bulletin, Sep. 1995, vol. 38, No. 9, pp. 7–9.

*Primary Examiner*—Glenton B. Burgess
*Assistant Examiner*—William Titcomb
*Attorney, Agent, or Firm*—Jeffrey S. LaBaw; David H. Judson

[57] ABSTRACT

A method of retrieving Web content from a plurality of Web servers for delivery to a Web client connectable to the World Wide Web via a communication link. The Web client is preferably a data processing system connectable to a television or other conventional monitor to provide low cost Internet access. The method begins by having the user define a set of one or more servers from which content is desired to be retrieved and stored in the cache. These servers are preferably identified by a "list" of favorite Web sites. A test is then made to determine whether a given download period has terminated. Typically, this download period occurs during an "off" period, such as in the middle of the night, to avoid traffic congestion at the Web server sites. If the given download period has not terminated, a determination is then made of an activity level for the communication link as content is being downloaded to the cache from the one or more servers. If the activity level for the communication link is less than a given threshold level, additional requests for content are issued to the cache according to a so-called "fairness policy" that ensures that content from as many sites as possible is downloaded during the download period.

23 Claims, 5 Drawing Sheets

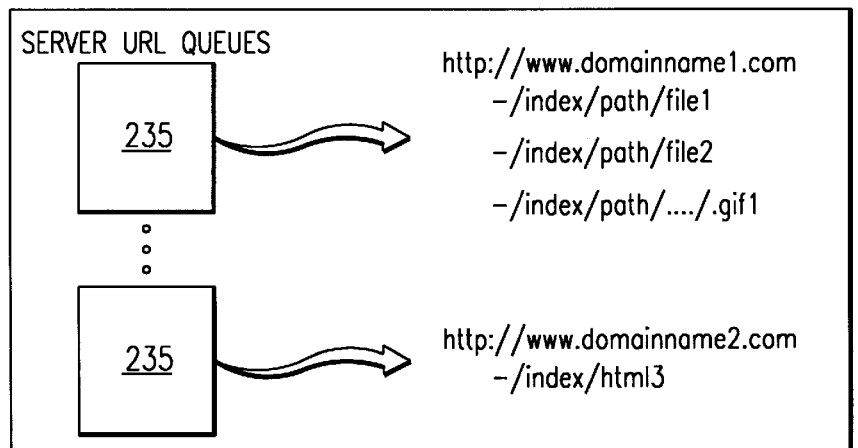
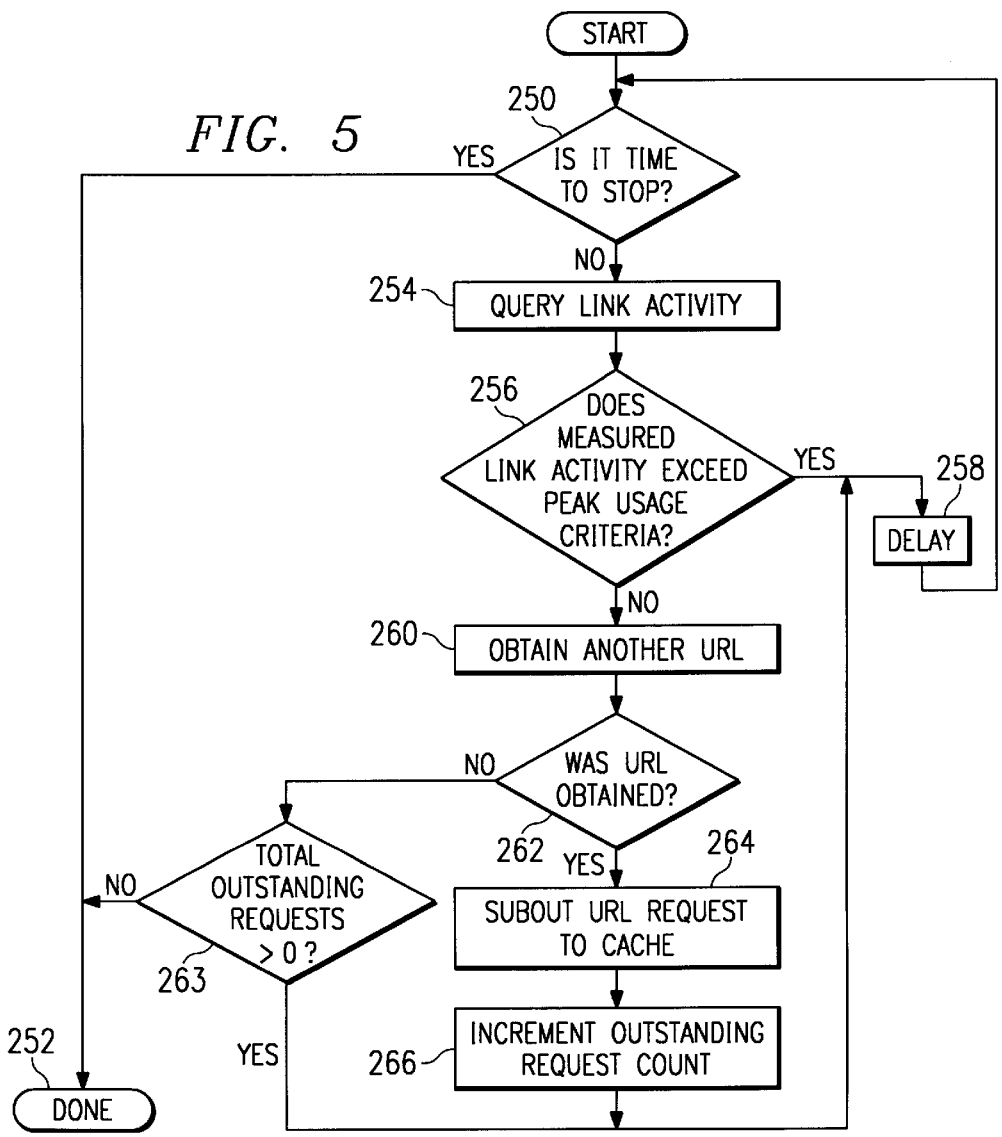
FIG. 4
FIG. 5

METHOD FOR OPTIMIZING OFF-PEAK CACHING OF WEB DATA

TECHNICAL FIELD

The present invention relates generally to World Wide Web information retrieval and more particularly to optimizing utilization of a communication link during offpeak caching of Web data.

BACKGROUND OF THE INVENTION

The World Wide Web of the Internet is the most successful distributed application in the history of computing. In the Web environment, client machines effect transactions to Web servers use the Hypertext Transfer Protocol (HTTP), which is a known application protocol providing users access to files (e.g., text, graphics, images, sound, video, etc.) using a standard page description language known as Hypertext Markup Language (HTML). HTML provides basic document formatting and allows the developer to specify "links" to other servers and files. In the Internet paradigm, a network path to a server is identified by a so-called Uniform Resource Locator (URL) having a special syntax for defining a network connection. Use of an HTML-compatible browser (e.g., Netscape Navigator or Microsoft Internet Explorer) at a client machine involves specification of a link via the URL. In response, the client makes a request to the server identified in the link and receives in return a document formatted according to HTML.

There has been great interest in providing Internet access at minimal economic cost. While most computers now are pre-configured for Internet access, a significant percentage of households still do not have a personal computer. Thus, it has now been proposed to provide a data processing system that, much like a VCR, may be connected to a television set and used in lieu of a personal computer to provide Web access through a conventional remote control device associated with the system unit. Such a system enables the television to become, in effect, a "Web" appliance. The viewer can rapidly switch between conventional television and Internet access using the remote control unit. All of the conventional "Internet" access tools and navigational functions are preferably "built-in" to the system and thus hidden to the user.

One such tool is so-called "off-line" browsing. As any casual user of the Internet can attest, interesting or attractive web sites are sometimes difficult to access due to large traffic demands. As a result, several companies have developed so-called "off-line" browser programs that are designed to deliver web pages from favorite Web servers to a user's hard drive for browsing at the user's convenience. Typically, such programs include some form of scheduling feature that enables the user to fetch identifiable pages at off-peak hours, saving time and connection charges. The user may then browse the pages at his or her convenience without a modem and even without an active connection to the Internet.

While off-line browser programs offer certain advantages, they do not have the capability to optimize utilization of the communication link between the client and the World Wide Web during the off-peak information retrieval process. This problem becomes more acute if there are constraints on the amount of time that off-peak information retrieval may be accomplished. In the future, it is anticipated that Web appliances of the type described above will be provided by computer network or other service providers, who will only allow their subscribers limited periods of time during which off-line browsing will be permitted. Thus, for example, a network operator may restrict subscribers to off-line browsing for just one hour per night. During this hour, a user may desire to obtain content from numerous Web sites. Thus, it would be desirable to provide some mechanism that could optimize retrieval of Web content during this limited period of time.

The present invention addresses and solves this important problem.

BRIEF SUMMARY OF THE INVENTION

It is thus a primary goal of the present invention to optimize utilization of the communication link between a Web appliance and World Wide Web servers during off-peak caching of Web data.

It is a further object of the invention to enhance off-peak caching of Web data when client access to the network is restricted.

It is another object of the invention to ensure that the link between a Web client and one or more Web servers is used to its maximum bandwidth during a time-restricted off-peak browsing session.

It is a further important object of the invention to provide equitable caching of content from a plurality of Web sites during an automatic download session so that a user obtains a significant percentage of the downloads that he or she desires.

It is another object to ensure that each of a plurality of Web sites has an opportunity to deliver content to a client during an automatic download session.

It is still another object of the invention to improve the functionality of off-line browsing programs to make more efficient use of limited communication resources.

It is yet another object of the invention to ensure maximum utilization of the Web client modem during off-peak caching of Web data from the World Wide Web of the Internet.

Still another object of the invention is to provide efficient off-peak Web browsing for a Web client appliance, such as a data processing system connected to a conventional television.

It is a more general object of the invention to provide a Web appliance with an off-line browsing capability.

These and other objects of the invention are provided in a method of retrieving Web content from a plurality of Web servers for delivery to a Web client connectable to the World Wide Web via a communication link. The Web client is preferably a data processing system connectable to a television or other conventional monitor to provide low cost Internet access. The method begins by having the user define a set of one or more servers from which content is desired to be retrieved and stored in the cache. These servers are preferably identified by a "list" of favorite Web sites. A test is then made to determine whether a given download period has terminated. Typically, this download period occurs during an "off" period, such as in the middle of the night, to avoid traffic congestion at the Web server sites. If the given download period has not terminated, a determination is then made of an activity level for the communication link as content is being downloaded to the cache from the one or more servers. If the activity level for the communication link is less than a given threshold level, additional requests for content are issued to the cache according to a so-called "fairness policy" that ensures that content from as many sites as possible is downloaded during the download period.

Thus, for example, according to the fairness policy the additional requests for content are issued to the set of one or more servers as one request per server in an ordered sequence. Alternatively, the additional requests for content are issued to the set of one or more servers up to a predetermined number of requests per server in an ordered sequence. Or, the additional requests are issued to the set of one or more servers based on the number of bytes received in the cache from a particular server. The fairness policy ensures that no one server "dominates" the download session to the exclusion of the other servers from which the user desires to download content. When content (i.e. a Web document) is received from a particular server, it is stored in the cache for off-line browsing. Prior to storage, the routine preferably removes duplicative and/or non-local HTML links so that subsequent access requests to the same document are handled more expediently.

According to another feature of the invention, a data processing system is provided to facilitate low cost Internet access. The system comprises two major parts: a remote control unit, and a base unit connectable to a monitor for providing Internet access under the control of the remote control unit. The base unit is, in effect, a computer, and includes a modem connected to a communication link, a processor, a memory, and various embedded control programs. These programs include a browser program including means responsive to commands from the remote control unit for generating a list of Web sites, and a cache control program for initiating download requests to the communication link based on the list of Web sites. An optimization routine maintains maximum utilization of the modem during a download session by issuing multiple HTTP GET requests to the cache control program based on the fairness policy.

The foregoing has outlined some of the more pertinent objects and features of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the Preferred Embodiment.

BRIEF DESCRIPTION OF THE DRAWINGS

For a more complete understanding of the present invention and the advantages thereof, reference should be made to the following Detailed Description taken in connection with the accompanying drawings in which:

FIG. 4 is a representative server URL queue list for the "favorites" list of FIG. 3;

FIG. 5 is a flowchart of a preferred method of the present invention for optimizing communication link activity during an off-peak caching session;

DETAILED DESCRIPTION

Figures 1A, 1D:
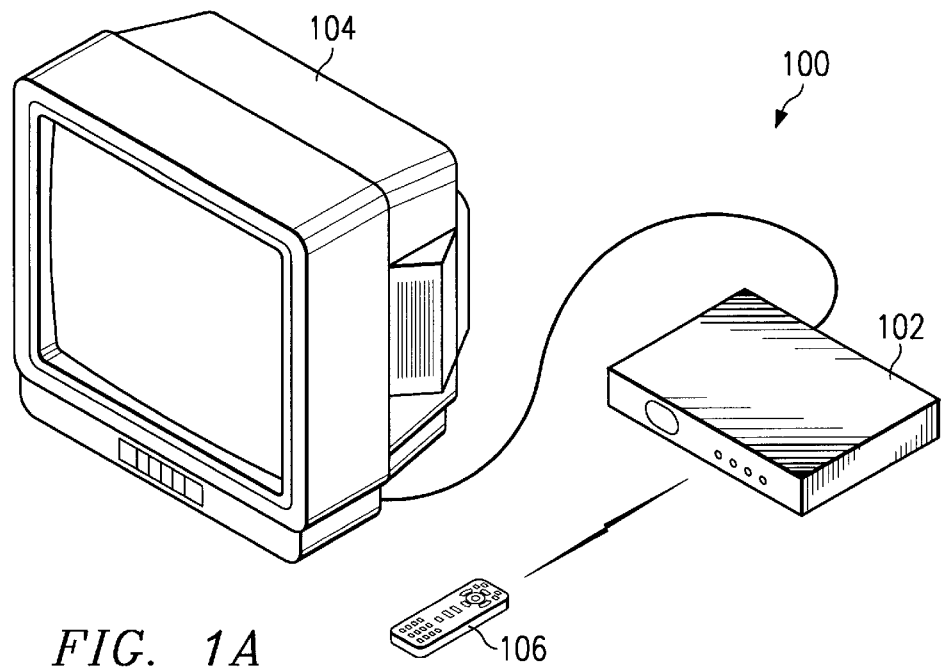
FIG. 1A is pictorial representation of a data processing system unit connected to a conventional television set to form a "Web" appliance.
FIG. 1D is a pictorial representation of a remote control unit associated with the data processing system unit of the invention.

With reference now to the figures, and in particular with reference to FIGS. 1A through 1D, various pictorial representations of a data processing system in which a preferred embodiment of the present invention may be implemented are depicted. FIG. 1A is a pictorial representation of the data processing system as a whole. Data processing system 100 in the depicted example provides, with minimal economic costs for hardware to the user, access to the Internet. Data processing system 100 includes a data processing unit 102. Data processing unit 102 is preferably sized to fit in typical entertainment centers and provides all required functionality, which is conventionally found in personal computers, to enable a user to "browse" the Internet. Additionally, data processing unit 102 may provide other common functions such as serving as an answering machine or receiving facsimile transmissions.

Data processing unit 102 is connected to television 104 for display of graphical information. Television 104 may be any suitable television, although color televisions with an S-Video input will provide better presentations of the graphical information. Data processing unit 102 may be connected to television 104 through a standard coaxial cable connection. A remote control unit 106 allows a user to interact with and control data processing unit 102. Remote control unit 106 allows a user to interact with and control data processing unit 102. Remote control unit 106 emits infrared (IR) signals, preferably modulated at a different frequency than the normal television, stereo, and VCR infrared remote control frequencies in order to avoid interference. Remote control unit 106 provides the functionality of a pointing device (such as a mouse, glidepoint, trackball or the like) in conventional personal computers, including the ability to move a cursor on a display and select items.

Figure 1B:
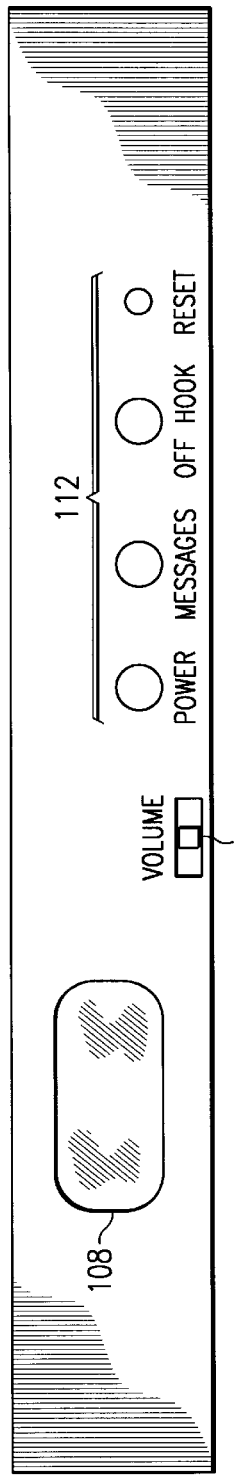
FIG. 1B is a pictorial representation of a front panel of the data processing system unit of the present invention.

FIG. 1B is a pictorial representation of the front panel of data processing unit 102 in accordance with a preferred embodiment of the present invention. The front panel includes an infrared window 108 for receiving signals from remote control unit 106 and for transmitting infrared signals. Data processing unit 102 may transmit infrared signals to be reflected off objects or surfaces, allowing data processing unit 102 to automatically control television 104 and other infrared remote controlled devices. Volume control 110 permits adjustment of the sound level emanating from a speaker within data processing unit 102 or from television 104. A plurality of light-emitting diode (LED) indicators 112 provide an indication to the user of when data processing unit 102 is on, whether the user has messages, whether the modem/phone line is in use, or whether data processing unit 102 requires service.

Figure 1C:
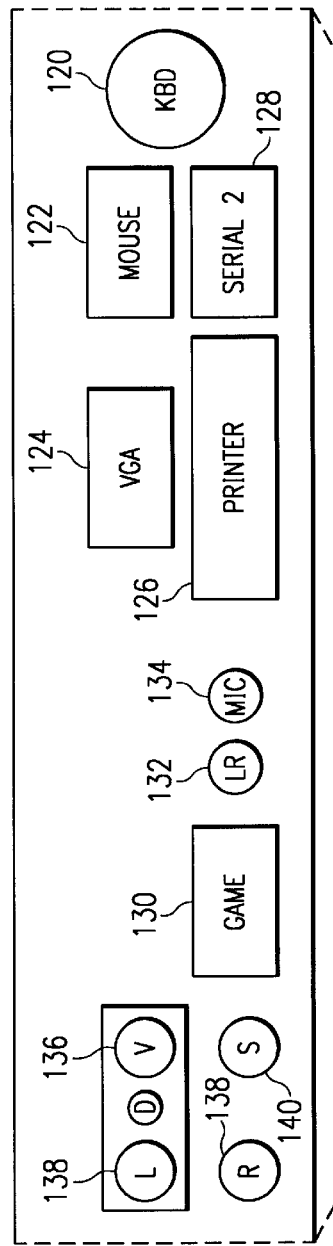
FIG. 1C is a pictorial representation of a rear panel of the data processing system unit.
Figure 1C:
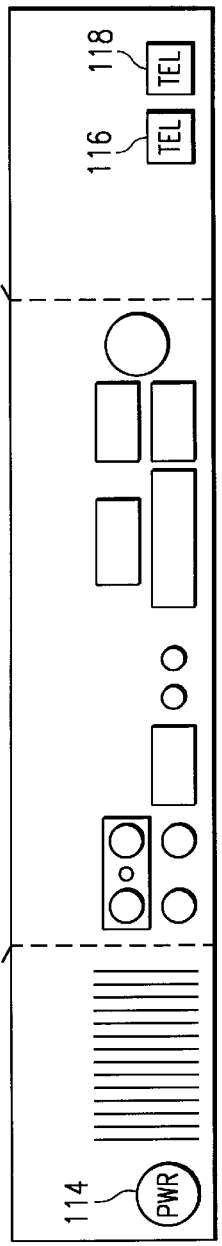

FIG. 1C is a pictorial representation of the rear panel of data processing unit 102 in accordance with a preferred embodiment of the present invention. A three wire (ground included) insulated power cord 114 passes through the rear panel. Standard telephone jacks 116 and 118 on the rear panel provide an input to a modem from the phone line and an output to a handset (not shown). The real panel also provides a standard computer keyboard connection 120, mouse port 122, computer monitor port 124, printer port 126, and an additional serial port 128. These connections may be employed to allow data processing unit 102 to operate in the manner of a conventional personal computer. Game port 130 on the rear panel provides a connection for a joystick or other gaming control device (glove, etc.). Infrared extension jack 132 allows a cabled infrared LED to be utilized to transmit infrared signals. Microphone jack 134 allows an external microphone to be connected to data processing unit 102.

Video connection 136, a standard coaxial cable connector, connects to the video-in terminal of television 104 or a video cassette recorder (not shown). Left and right audio jacks 138 connect to the corresponding audio-in connectors on television 104 or to a stereo (not shown). If the user has S-Video input, then S-Video connection 140 may be used to connect to television 104 to provide a better picture than the composite signal. If television 104 has no video inputs, an external channel ¾ modulator (not shown) may be connected in-line with the antenna connection.

FIG. 1D is a pictorial representation of remote control unit 106 in accordance with a preferred embodiment of the present invention. Similar to a standard telephone keypad, remote control unit 106 includes buttons 142 for Arabic numerals 0 through 9, the asterisk or "star" symbol (*), and the pound sign (#). Remote control unit also includes "TV" button 144 for selectively viewing television broadcasts and "Web" button 146 for initiating "browsing" of the Internet. Pressing "Web" button 146 will cause data processing unit 102 to initiate modem dial-up of the user's Internet service provider and display the start-up screen for an Internet browser. The browser includes a "Favorites" or "Bookmarks" feature that enables the viewer to record the Uniform Resource Locator (URL) for those Web sites that the user desires to revisit.

Figure 3:
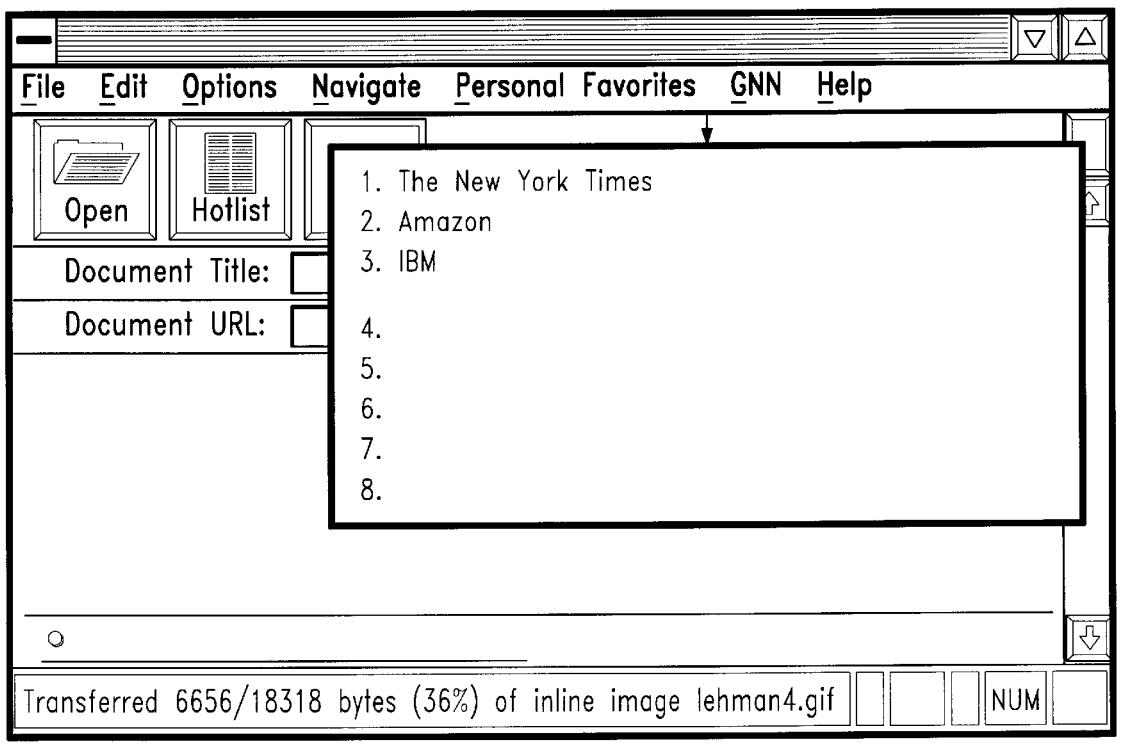
FIG. 3 is a representative "favorites" list created by the user as a result of browsing the World Wide Web of the Internet.

A pointing device 147, which is preferably a trackpoint or "button" pointing device, is included on remote control unit 106 and allows a user to manipulate a cursor on the display of television 104. "Go" and "Back" buttons 148 and 150, respectively, allow a user to select an option or return to a previous selection. "Help" button 151 causes context-sensitive help to be displayed or otherwise provided. "Menu" button 152 causes a context-sensitive menu of options to be displayed, and "Update" button 153 will update the options displayed based on the user's input, while home button 154 allows the user to return to a default display of options. One of the options is the Favorites or Bookmarks list. A representative list is shown in FIG. 3 as a pull-down menu 155 on the television screen. "PgUp" and "PgDn" buttons 156 and 158 allows the user to change the context of the display in display-sized blocks rather than by scrolling. The message button 160 allows the user to retrieve messages.

In addition to, or in lieu of, remote control unit 106, an infrared keyboard (not shown) with an integral pointing device may be used to control data processing unit 102. The integral pointing device is preferably a trackpoint or button type of pointing device. A wired keyboard (also not shown) may also be used through keyboard connection 120, and a wired pointing device such as a mouse or trackball may be used through mouse port 122. When a user has one or more of the remote control unit 106, infrared keyboard, wired keyboard and/or wired pointing device operable, the active device locks out all others until a prescribed period of inactivity has passed.

Figure 2:
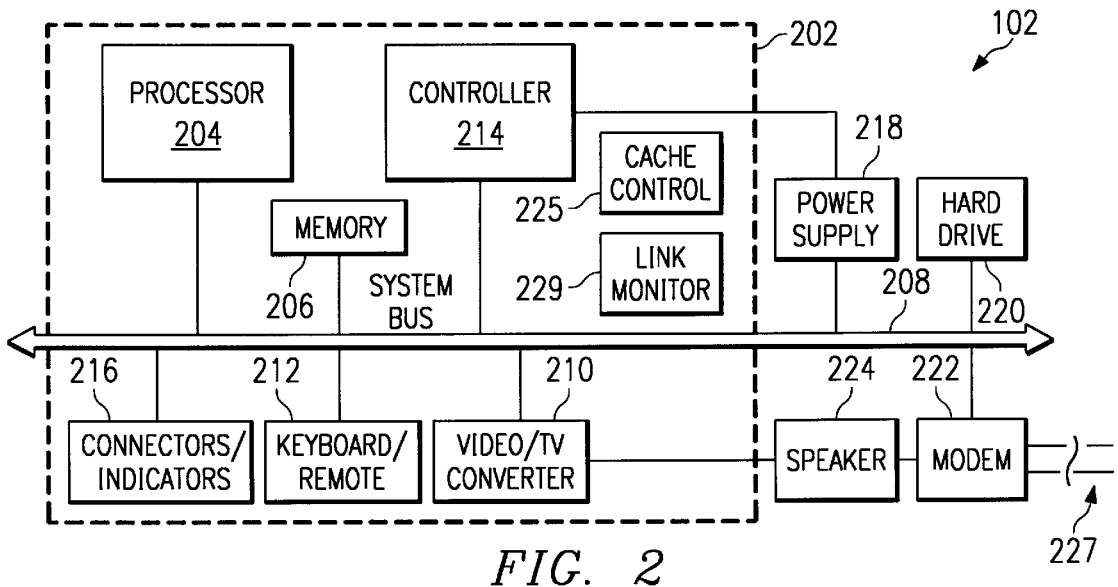
FIG. 2 is a block diagram of the major components of the data processing system unit in accordance with a preferred embodiment of the present invention.

Referring now to FIG. 2, a block diagram for the major components of data processing unit 102 in accordance with a preferred embodiment of the present invention is portrayed. As with conventional personal computers, data processing unit 102 includes a motherboard 202 containing a processor 204 and memory 206 connected to system bus 280. Processor 205 is preferably at least a 486 class processor operating at or above 100 MHz. Memory 206 may include cache memory and/or video RAM. Processor 205, memory 206, and system bus 208 operate in the same manner as corresponding components in a conventional data processing system.

Video/TV converter 210, located on motherboard 202 and connected to system bus 208, generates computer video signals for computer monitors, a composite television signal, and an S-Video signal. The functionality of Video/TV converter 210 may be achieved through a Trident TVG9685 video chip in conjunction with an Analog Devices AD722 converter chip. Video/TV converter 210 may require loading of special operating system device drivers.

Keyboard/remote control interface unit 212 on motherboard 202 receives keyboard codes through controller 214, regardless of whether a wired keyboard/pointing device or an infrared keyboard/remote control is being employed. Infrared remote control unit 106 transmits signals which are ultimately sent to the serial port as control signals generated by conventional mouse or pointing device movements. Two buttons on remote control unit 106 are interpreted identically to the two buttons on a conventional mouse, while the remainder of the buttons transmit signals corresponding to keystrokes on an infrared keyboard. Thus, remote control unit 106 has a subset of the function provided by an infrared keyboard.

Connectors/indicators 216 on motherboard 202 provide some of the connections and indicators on data processing unit 102 described above. Other connections are associated with and found on other components. For example, telephone jacks 116 and 118 are located on modem 222. The power indicator within connectors/indicators 216 is controlled by controller 214.

External to motherboard 202 in the depicted example are power supply 218, hard drive 220, modem 222 and speaker 224. Power supply 218 is a conventional power supply except that it receives a control signal from controller 214 which effects shut down of all power to motherboard 202, hard drive 220 and modem 222. In some recovery situations, removing power and rebooting is the only guaranteed method of resetting all of these devices to a known state. Thus, power supply 218, in response to a signal from controller 214, is capable of powering down and restarting data processing unit 102.

Controller 214 is preferably one or more of the 805x family controllers. Controller 214 receives and processes input from infrared remote control 106, infrared keyboard, wired keyboard, or wired mouse. When one keyboard or pointing device is used, all others are locked out (ignored) until none have been active for a prescribed period. Then the first keyboard or pointing device to generate activity locks out all others. Controller 214 also directly controls all LED indicators except that indicating modem use. As part of the failure recovery system, controller 214 specifies the boot sector selection during any power off-on cycle.

Hard drive 220 contains operating system and applications software for data processing unit 102, which preferably includes IBM DOS 7.0, a product of International Business Machines Corporation in Armonk, N.Y.; an operating system such as Windows 3.1 (or higher), a product of Microsoft Corporation in Redmond, Wash.; and Netscape Navigator (Version 1.0 or higher), a product of Netscape Communications Corporation in Mountain View, Calif. Minor modifications of these software packages may be desirable to optimize performance of data processing unit 102. Also, it is highly desirable to update one or more of these "off-the-shelf" programs as well as the other software used by the present invention by downloading new versions of the code via the Internet. Web appliance includes appropriate control software to facilitate such downloading. Hard drive 220 also stores data, such as the list of favorite Internet sites or unviewed downloads from one or more Internet site(s). A cache controller program 225 run by the processor is used to administer and manage these downloads as will be described below.

Modem 222 may be any suitable modem used in conventional data processing systems, but is preferably a 33.6 kbps modem supporting the V.42bis, V.34, V.17 Fax, MNP 1–5, and AT command sets. To maintain the slim height of data processing system 102, modem 222 is preferably inserted into a slot mounted sideways on motherboard 202. Modem 222 is connected to a physical communication link 227, which, in turn, in connected or connectable to the World Wide Web of the Internet (not shown). As is well-known, the World Wide Web is the Internet's multimedia information retrieval system. In the Hypertext Transfer Protocol (HTTP), which provides users access to files using Hypertext Markup Language (HTML). A link activity monitor 229 determines the extent to which the communication link 227 is being utilized at a given point in time. The link activity monitor may be a hardware-based controller or a software application run by the processor.

Figure 7:
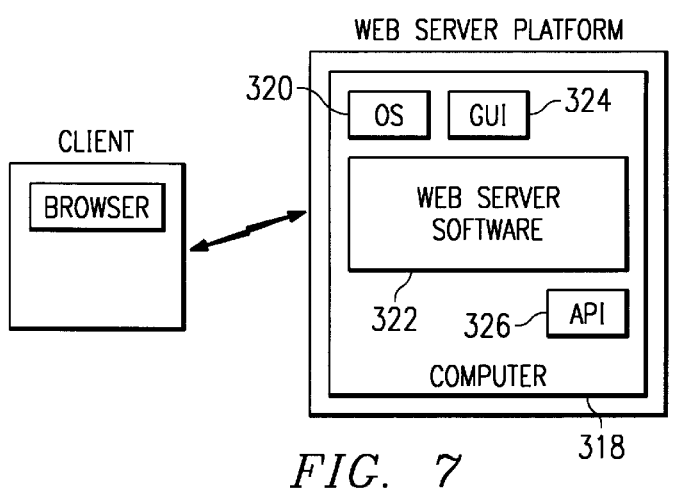
FIG. 7 is a block diagram of a representative Web server platform or Web site.

A Web server, sometimes referred to as a "Web" site, supports hypertext documents in directories and files accessible through the Uniform Resource Locator. Typically, all hypertext documents available at a particular Web site are considered part of the same "domain" (e.g., www.domainname.com). Pages that are "local" to the domain usually are identified by a "relative" link, which is a reference to a path and/or filename within the domain, e.g., www.domainname.com/path/html1. A representative Web server is illustrated in FIG. 7 below.

Those skilled in the art will recognize that the components depicted in FIGS. 1A–1D and 2 and described above may be varied for specific applications or embodiments. Such variations in which the present invention may be implemented are considered to be within the spirit and scope of the present invention.

It is desired to enable a user of the data processing system to browse the Web "off-line." This function is provided by the cache controller 225. The cache controller may be a piece of dedicated hardware, or it may be an application program run by the processor. In the preferred embodiment, cache controller 225 is implemented as a software program upgradable through Internet downloads.

As noted above, during one or more on-line browsing sessions, a viewer may compile a list of "favorite" or "bookmark" Web sites that he or she desires to revisit. All or any portion of this list may also be designated for access "off-line" so that the content of such sites may be downloaded and stored in a dedicated "cache" of the hard drive for later viewing, preferably "off-line." The cache controller program thus includes a control engine 231 (preferably implemented in software run by the processor) for controlling the modem 222 to dial up and connect to the Internet site(s) automatically (e.g., each night while the appliance is unattended). As seen in FIG. 4, each "favorite" Web site is associated with a server URL queue 235. A server URL queue 235 is a data structure that identifies the URL of the Web site as well as one or more HTML links spawned from (i.e. located within) the page. Preferably, the server URL queue 235 includes only relative links, although this is not a limitation of the present invention. Moreover, although the queue 235 is shown as a dedicated portion of the memory 206, this is not a requirement, as the queue may be a linked list or any other convenient data structure.

In a representative embodiment, the user will not have the ability to set the time period during which the engine will cache Internet site content; rather, this time period is predetermined by the network service provider. Generally, this time period will be restricted, e.g., one (1) hour per night. Therefore, according to the present invention, the cache controller program 225 also includes an optimization routine to ensure that the modem 222 is used to its maximum capability during the restricted period of time that Internet sites are cachable to the hard drive 220. Moreover, the optimization routine includes a "load balancing" function to ensure that content identified by the server URL queues is equitably cached during the download period. As will be seen, this feature of the invention enables the viewer to obtain a significant percentage of the downloads that he or she desires.

This optimization routine is now described with reference to the flowchart of FIG. 5. The primary processing of the routine begins at step 250 with a test to determine whether it is time to stop the process, i.e. whether the predetermined download period has expired. As discussed above, in an exemplary embodiment, this download period is one (1) hour, although it should be appreciated that other time period(s) may be used as well. This period may also be selectively adjusted if desired, but typically not by the user. If the outcome of the test at step 250 is positive, the primary processing routine is complete at step 252. If more time is available, then the routine continues at step 254 to query the activity on the communication link 227 to which the modem 222 is connected. Step 254 determines how much "bandwidth" is being used since a last "iteration" or cycle (of the routine) by receiving information from the link activity monitor 229. The routine then continues at step 256 to test whether the measured link activity meets some peak usage criteria.

As discussed above, the present invention has as a goal to maximize download throughput to the cache during the download period. The peak usage criteria generally is dependent on conditions on the communication link, the modem type, or such other criteria as may be predetermined or defined. Thus, for example, peak usage criteria may be defined by an average link utilization for a monitored interval exceeded some preset limit between 0–100%. Or, the peak usage criteria may be based on some predefined limit on the number of outstanding HTTP GET requests that are issued from the cache manager to the network. A given HTTP GET request is used to request download of the content from a given Web site. Thus, for example, the peak usage criteria may be defined to include: not less than N total outstanding HTTP GET requests, not more than M total outstanding GET requests (M>N), and so on. According to the present invention, any convenient "peak usage" criteria may be used in the comparison at step 256.

If the link activity meets the peak usage criteria, then the modem 222 is being used to its maximum capacity. As a result, the outcome of the test at step 256 is positive and the routine loops back to step 258, which is indicated as a delay. This box reflects that no more content requests are submitted. The routine then returns to step 250, as previously described.

If, however, the link activity does not meet the peak usage criteria, then, in effect, the modem is not being used to its maximum capacity. This is a negative outcome of the test at step 256. As a result, the routine continues at step 260 to obtain another URL from a server URL queue. The particular way in which this is accomplished will be described below, but it will be appreciated that the present invention provides a "load balancing" function that ensures that content identified by the server URL queue(s) 235 is cached equitably during the session. At step 262, a test is made to determine whether a URL was obtained from a queue. If not, the routine continues by testing at step 263 whether the total outstanding requests is greater than 0. If the result of the test at step 263 is positive, then the routine returns to the path of the delay 258 and returns. If the result of the test at step 263 is negative, meaning that no more outstanding requests exist, the routine is done and terminates. This outcome would occur, for example, if there were no more unserviced URLs on any server URL queue. If a URL was obtained at step 260, the outcome of the test at step 262 is positive, and the routine continues at step 264 to submit the URL request to the cache controller. Although not described in detail here, it should be appreciated that the cache controller then processes the request in a known manner to initiate the download process. The routine then continues at 266 to increment a count of the number of outstanding requests. This number may be a total for the overall sessions, or a per server URL queue count, or both. After step 266, the routine returns again through the delay loop and recycles until the outcome of the test at step 250 indicates that the download session is complete.

It should be appreciated that the flowchart shown in FIG. 5 is merely representative of the processing flow. The precise sequence flow illustrated is not meant to be taken by way of limitation. Thus, for example, the step of obtaining a URL (shown as step 260) could be carried out before querying the link activity (at step 254), and so on.

According to a feature of the present invention, it is desired to "load balance" the content downloads from the "favorite" Web sites so that the user obtains as broad a range of content as is possible during the restricted download period. As a result, web servers that are slow or busy (even during the off-peak hour) do not impact adversely the downloading process. This is achieved by implementing a so-called "fairness policy" during the download process. In the preferred embodiment, this means that each server on the "favorites" list has an opportunity to deliver content to the client during the caching session. In particular, some policy designed to achieve equitable caching of the content identified by the one or more server URL queues 235 is implemented for this purpose. The specific policy may be as simple as a "round robin" policy under which a particular URL is taken off each server URL queue (in first in, first out order) irrespective of the number of relative links within a particular queue. Thus, for example, during a first iteration of step 260 discussed above, the first URL is taken from the first server URL queue. At the next iteration, the first URL is taken from the second server URL queue, and so on. Alternatively, the policy may start with a particular server URL queue but then limit the number of outstanding requests per server before requests for another server are used. In this example, the fairness policy would dictate that "never more than x outstanding requests per server" would be used. Thus, the first x URLs (which would include the "home page" and x-1 relative links) would be taken from the first server URL queue before using the URLs from a second server URL queue, and so on. Another fairness policy could be based on the total number of bytes received from a particular server, irrespective of the number of URL requests generated from a particular server URL queue. In this manner, the policy could restrict the total number of bytes cached from any particular server. Another approach to fairness would be limit the "link" depth of documents retrieved from a particular server. A link depth limitation would ensure that only a page with a large number of nested or embedded links would not unnecessarily "bias" the download process to the exclusion of other servers. Still another approach would be to identify certain types of "sites" on the favorites list and serve such sites last because they would otherwise conserve too much of the download cycle. Thus, for example, a directory site (with thousands of links) might be identified and placed on the backend of the service list to ensure that the other sites get their chance to contribute to the download.

Of course, one of ordinary skill will appreciate that the above examples are not mutually exclusive and are not limiting. Any fairness policy that has a goal of ensuring that each server on the favorites list has at least an opportunity to contribute to the download is within the scope of the present invention. This is true irrespective of whether content is actually received by the client during the session.

Thus, the above examples are merely representative of the types of criteria that may be used to implement a fairness policy. One or more of these examples may be combined to provide even more fine tuning of the precise amount of content cached from each of the "favorite" sites during the download session. The result of this "load balancing" approach is that each server at least has a theoretical and practical opportunity to contribute content; the user thus obtains a significant percentage of the favorite sites requested, even though some of the particular content may not be downloaded during the actual session. This is typically not a problem, however, since the cache will usually retain a copy (albeit possibly outdated) of the particular content that does not make it down to the cache during a particular download session. Thus, the viewer will still have a "complete" version of the favorite site, and the load balancing process ensures that he or she will have a broader scope of the overall list.

Figure 6:
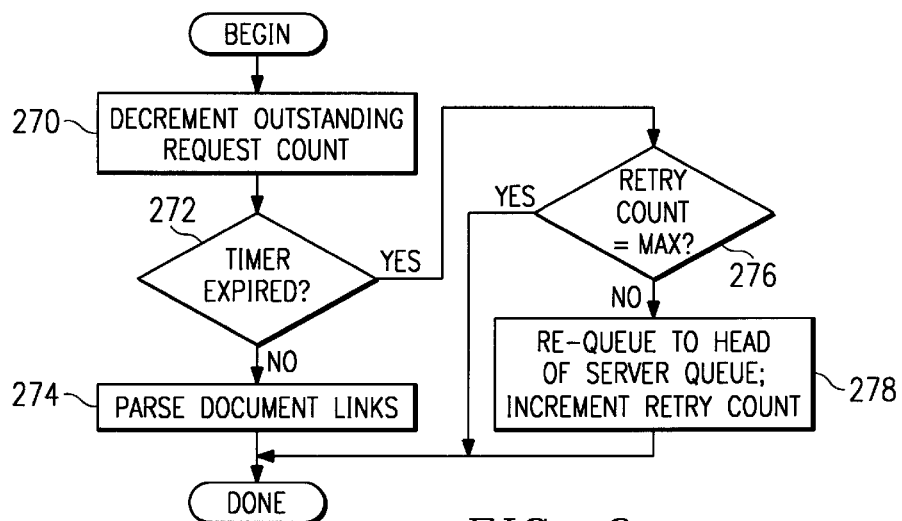
FIG. 6 is a flowchart of the process response routine that is executed for each Web document received in response to a URL request.

Referring now to FIG. 6, a flowchart is shown of the process response routine that is run for each GET request submitted to the network by the cache manager at step 264 of FIG. 5. It begins at step 270 by decrementing the count of the number of outstanding requests, since the particular request has been delivered to the network for service. At step 272, a test is run to determine whether a timer has expired for a particular request without the document being received. If the response to the test at step 272 is negative, the document has been received and the routine continues at step 274 to parse the document links. Although not meant to be limiting, during this step duplicate URLs or links that have already been visited are stripped from the document and thus are not returned back to the server URL queue. In addition, non-local links (except possibly images, e.g., .gif or .jpeg files) are also stripped from the document. Removal of such links ensures that more efficient processing of the document may be achieved during the next download session involving the document. Although the above processing is desired, other types of intelligent processing may be applied to the returned document. Thus, for example, the step may include a command to follow a certain type of string, or to limit the link depth of the document, or to apply a byte-count restriction, and so on. The particular type of intelligent processing is not limited in any way, and any technique that may be useful is facilitating the subsequent download process is useful according to the invention. After step 274, the routine is done.

If the outcome of the test at step 272 is positive, which indicates that the document has not yet been received in response to the original request, the routine continues at step 276 to test whether a retry count has run a predetermined number of times. If so, the routine terminates. If not, the routine continues at step 278 to re-queue the request to the head of its particular server URL queue and to increment the retry counter for this particular request. By placing the URL request at the head of the server URL queue, it has a better chance of being re-serviced quickly (depending, of course, on the particular fairness policy being implemented). After step 278, the process terminates.

Turning now to FIG. 7, a block diagram is shown of a representative Web server platform which supports content to be downloaded to the Web client. This platform is representative of a "Web" site. The platform 312 comprises an IBM RISC System/6000 computer 318 (a reduced instruction set of so-called RISC-based workstation) running the AIX (Advanced Interactive Executive Version 4.1 and above) Operating System 320 and a Web server program 322, such as Netscape Enterprise Server Version 2.0, that supports interface extensions. The platform 312 also includes a graphical user interface (GUI) 324 for management and administration. The various models of the RISC-based computers are described in many publications of the IBM Corporation, for example, *RISC System/6000, 7013 and 7016 POWERstation and POWERserver Hardware Technical Reference*, Order No. SA23-2644-00. AIX OS is described in *AIX Operating System Technical Reference*, published by IBM Corporation, First Edition (November 1985), and other publications. While the above platform is useful, any other suitable hardware/operating system/web server combinations may be used.

Figure 8:
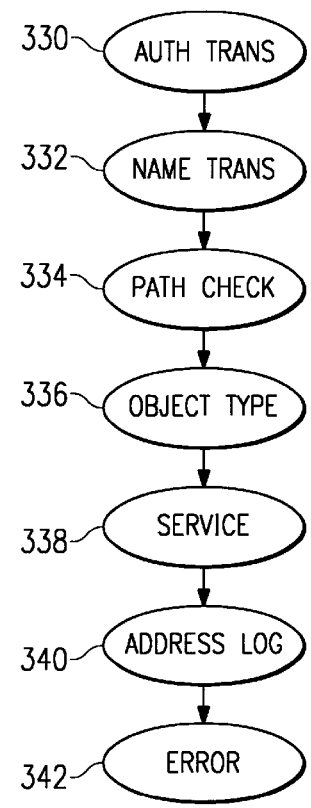
FIG. 8 is a flowchart of the methods that are carried out by a Web server in response to receipt of a request from an Internet client such as the Web appliance described herein.

The Web Server accepts a client request and returns a response. The operation of the server 322 is governed by a number of server application functions (SAFs), each of which is configured to execute in a certain step of a sequence. This sequence, illustrated in FIG. 8, begins with authorization translation (AuthTrans) 330, during which the server translates any authorization information sent by the client into a user and a group. If necessary, the AuthTrans step may decode a message to get the actual client request. At step 332, called name translation (NameTrans), the URL associated with the request may be kept intact or it can be translated into a system-dependent file name, a redirection URL or a mirror site URL. At step 334, called path checks (PathCheck), the server performs various tests on the resulting path to ensure that the given client may retrieve the document. At step 336, sometimes referred to as object types (ObjectType), MIME (Multipurpose Internet Mail Extension) type information (e.g., text/html, image/gif, etc.) for the given document is identified. At step 338, called Service (Service), the Web server routine selects an internal server function to send the result back to the client. This function can run the normal server service routine (to return a file), some other server function (such as a program to return a custom document) or a CGI program. The present invention primarily concerns the situation where the server function runs a CGI program resident on the Web server. At step 340, called Add Log (AddLog), information about the transaction is recorded. At step 342, called Error, the server responds to the client when it encounters an error. Further details of these operations may be found in the Netscape *Web Server Programmer's Guide*, Chapter 5, which is incorporated herein by reference.

Thus, the Web server includes a known set of server application functions (SAFs). These functions take the client's request and other configuration data of the server as input and return a response to the server as output. Referring back to FIG. 7, the Web server also includes an Application Programming Interface (API) 326 that provides extensions to enable application developers to extend and/or customize the core functionality thereof (namely, the SAFs) through software programs commonly referred to as "plug-ins."

One of the preferred implementations of the optimization routine of the invention is as a set of instructions (program code) in a code module resident in the memory of the processor of the data processing system. Alternatively, the routine may be program code resident in a random access memory of a computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. When the code is electronically delivered, a computer program product is said to comprise the program data (electronically delivered) stored in the substrate of a computer-readable storage medium such as the hard drive, floppy disk or other conventional storage media. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

As used herein, "Web" client should be broadly construed to mean any computer or component thereof directly or indirectly connected or connectable in any known or later-developed manner to a computer network, such as the Internet. A Web client may be the data processing system described above, taken alone or in combination with a television set of other device. The term "Web" server should also be broadly construed to mean a computer, computer platform, an adjunct to a computer or platform, or any component thereof.

Further, although the invention has been described in terms of a preferred embodiment in a specific environment, those skilled in the art will recognize that the invention can be practiced, with modification, in other and different hardware and operating system architectures with the spirit and scope of the appended claims. Thus, for example, the concepts of the present invention may be implemented conveniently as a plug-in to a conventional browser program operating in a personal computer. Moreover, the preferred processing flow and steps may be altered. Thus, for example, it is not required that the inventive scheme be implemented during a time-bounded downloading or caching session. The optimization technique may be conveniently applied in any Internet client that desires to cache content from a plurality of servers according to a fairness policy wherein each of the servers has an opportunity to contribute to the download.

Having thus described our invention, what we claim as new and desire to secure by letters patent is set forth in the following claims:

1. A method of retrieving Web content for delivery to a Web client connectable to the World Wide Web via a communication link, the Web client including a cache, comprising the steps of:

a) defining a set of Web servers from which content is desired to be retrieved and stored in the cache;

b) determining an activity level for the communication link as content is being downloaded to the cache from the servers; and c) if the activity level for the communication link is less than a threshold level, issuing to the cache, additional requests for content according to a policy that ensures that each of the servers of the set has a fair share of opportunities to deliver content to the Web client.

2. The method as described in claim 1 wherein content is downloaded to the cache during a predetermined time period.

3. The method as described in claim 1 wherein according to the policy the additional requests for content are issued to the set of servers as one request per server in an ordered sequence.

4. The method as described in claim 1 wherein according to the policy the additional requests for content are issued to the set of servers up to a predetermined number of requests per server in an ordered sequence.

5. The method as described in claim 1 wherein according to the policy the additional requests for content are issued to the set of servers based on predetermined parameters.

6. The method as described in claim 5 wherein the predetermined parameters include a link depth of a document located on a particular server.

7. The method as described in claim 5 wherein the predetermined parameters include a number of bytes received in the cache from a particular server.

8. The method as described in claim 1 further including the step of processing the content received from a server to remove duplicative links.

9. The method as described in claim 1 further including the step of processing the content received from a server to remove non-local links.

10. The method as described in claim 1 wherein the threshold level of the communication link is a given number of outstanding requests for content.

11. The method as described in claim 1 wherein the threshold level of the communication link is an average link utilization rate for a given monitored interval.

12. A method of retrieving Web content for delivery to a Web client connectable to the World Wide Web via a communication link, the Web client including a cache, comprising the steps of:

a) defining a set of Web servers from which content is desired to be retrieved and stored in the cache;

b) determining whether a given download period has terminated;

c) if the given download period has not terminated, determining an activity level for the communication link as content is being downloaded to the cache from the servers; and d) if the activity level for the communication link is less than a threshold level, issuing to the cache additional requests for content according to a policy that ensures that each of the servers of the set has a fair share of opportunities to deliver content to the web client.

13. The method as described in claim 12 wherein the given download period is selectable.

14. The method as described in claim 12 wherein the given download period is approximately one hour.

15. The method as described in claim 12 wherein according to the fairness policy the additional requests for content are issued to the servers as one request per server in an ordered sequence.

16. The method as described in claim 12 wherein according to the fairness policy the additional requests for content are issued to the servers up to a predetermined number of requests per server in an ordered sequence.

17. The method as described in claim 12 wherein according to the fairness policy the additional requests for content are issued to the servers based on the number of bytes received in the cache from a particular server.

18. The method as described in claim 12 further including the step of processing the content received from a server to remove duplicative and non-local links.

19. A data processing system, comprising:

a remote control unit; and a base unit connectable to a monitor for providing Internet access under the control of the remote control unit, the base unit comprising:

a modem connected to a communication link;

a processor;

a memory;

a browser program run by the processor and including means responsive to commands from the remote control unit for generating a list of Web sites;

a cache control program run by the processor and including means for initiating download requests to the communication link based on the list of Web sites; and a policy control program run by the processor and including means for issuing multiple HTTP GET requests to the cache control program to ensure that each of the Web sites on the list has a fair share of opportunities to contribute content during a given download session.

20. A computer program product for retrieving Web content for delivery to a Web client connectable to the World Wide Web via a communication link, the Web client including a cache, the computer program product comprising:

a computer-readable storage medium having a substrate; and program data encoded in the substrate of the computer-readable storage medium, wherein the program comprises:

means for defining a set of servers from which content is desired to be retrieved and stored in the cache;

means for monitoring an activity level for the communication link as content is being downloaded to the cache from the servers; and means responsive to the monitoring means for issuing to the cache additional requests for the content according to a fairness policy that ensures that each of the servers has a fair share of opportunities to contribute content to the Web client during a download session.

21. A computer, comprising:

a processor;

a memory including a cache;

a modem connected to a communication link;

a Web browser program run by the processor for initiating download requests to the communication link based on the list of Web sites and for receiving downloads that are stored in the cache for off-line browsing; and a fairness policy control program run by the processor issuing multiple HTTP GET requests to the cache control program to ensure that each of the Web sites on the list has a fair share of opportunities to contribute content during a given download session.

22. A computer system, comprising:

a plurality of Web sites;

at least one client computer connectable to each of the plurality of Web sites via a computer network, wherein the client computer comprises:

a processor;

a memory including a cache;

a modem connected to the computer network;

a Web browser program run by the processor for providing World Wide Web information retrieval and including menu means for generating a list of Web sites to be downloaded during off-peak download session;

a cache control program run by the processor for initiating download request to the communication link based on the list of Web sites and for receiving downloads that are stored in the cache for off-line browsing; and a fairness policy control program run by the processor issuing multiple HTTP GET requests to the cache control program to ensure that each of the Web sites on the list has a fair share of opportunities to contribute content during a given download session.

23. A computer program product for retrieving Web content for delivery to a Web client connectable to the World Wide Web via a communication link, the Web client including a cache, the computer program product comprising:

a computer-readable storage medium having a substrate; and program data electronically delivered for storage in the substrate of the computer-readable storage medium, wherein the program data comprises:

means for defining a set of servers from which content is desired to be retrieved and stored in the cache;

means for monitoring an activity level for the communication link as content is being downloaded to the cache from the servers; and means responsive to the monitoring means for issuing to the cache additional requests for content according to a fairness policy that ensures that each of the servers has a fair share of opportunities to contribute content to the Web client during a download session.

* * * * *